(12) United States Patent
Hamann et al.

(10) Patent No.: US 6,532,125 B1
(45) Date of Patent: Mar. 11, 2003

(54) APPARATUS AND METHOD SUITABLE FOR MAGNETIC-THERMAL RECORDING

(75) Inventors: Hendrik F. Hamann, Mohegan Lake, NY (US); Yves Martin, Ossining, NY (US); Hemantha Kumar Wickramasinghe, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/408,946

(22) Filed: Sep. 30, 1999

(51) Int. Cl.[7] .................... G11B 5/02; G11B 11/00; G11B 11/10
(52) U.S. Cl. .................. 360/59; 369/13.01; 369/13.11; 369/13.2; 346/74.4; 219/209; 219/540
(58) Field of Search ................ 360/59, 55; 369/13.01, 369/13.02, 13.24, 126, 13.11, 13.33, 13.2, 13.12; 219/530, 540, 443.1, 209, 121.6; 392/432, 433, 435; 346/74.4; G11B 11/00, 5/02, 11/10, 11/24, 13/08, 20/10

(56) References Cited

U.S. PATENT DOCUMENTS

| | | | | |
|---|---|---|---|---|
| 3,368,209 A | * | 2/1968 | McGlauchlin et al. | ........ 360/59 |
| 3,824,617 A | * | 7/1974 | Kobayashi et al. | ........... 360/16 |
| 4,466,004 A | * | 8/1984 | Kobayashi et al. | ........ 346/74.4 |
| 4,949,198 A | * | 8/1990 | Huijer et al. | .................. 360/59 |
| 5,481,527 A | * | 1/1996 | Kasanuki et al. | ......... 369/126 |
| 5,751,316 A | * | 5/1998 | Bailey et al. | ................. 347/63 |
| 5,819,446 A | * | 10/1998 | Pearl et al. | ..................... 38/66 |
| 5,986,978 A | * | 11/1999 | Rottmayer et al. | ...... 369/13.17 |
| 6,011,664 A | * | 1/2000 | Kryder et al. | ................ 360/59 |
| 6,175,688 B1 | * | 1/2001 | Cassidy et al. | ............. 392/470 |
| 6,304,527 B1 | * | 10/2001 | Ito et al. | ................... 369/44.23 |
| 6,317,280 B1 | * | 11/2001 | Nakajima et al. | ............. 360/59 |

FOREIGN PATENT DOCUMENTS

JP    2002074606 A   *   3/2002   ............ G11B/5/02

* cited by examiner

*Primary Examiner*—David Hudspeth
*Assistant Examiner*—Dan I. Davidson
(74) *Attorney, Agent, or Firm*—Stephen C. Kaufman, Esq.; McGinn & Gibb, PLLC

(57) ABSTRACT

The invention discloses novel apparatus/methodology for writing/erasing high-density data on a digital recording media. A preferred embodiment of the invention features a novel thermal near-field heater that may be employed in the apparatus, particularly for realizing the methodology in a substantially thermal near-field mode. The invention provides advantages of data storage densities greater than that of diffraction limited systems, for example, data storage densities of approximately greater than 100 Gbit/inch$^2$, and writing speeds approximately greater than 100 MHz.

23 Claims, 6 Drawing Sheets

APPARATUS AND METHOD SUITABLE FOR MAGNETIC-THERMAL RECORDING

FIELD OF THE INVENTION

This invention relates to novel apparatus and method suitable for magnetic-thermal recording.

INTRODUCTION TO THE INVENTION

The significance and novelty of the present invention and its discoveries, with respect to magnetic-thermal recording, may be discerned by first referencing and setting in apposition a disparate and important recording technology, namely, thermo-magnetic recording utilizing a focused laser beam.

In particular, thermo-magnetic recording employing a focused laser beam contemplates using the focused laser beam for creating a hot spot on a thermo-magnetic material. The thermo-magnetic material, in turn, typically comprises a thin film magnetic media, which, at ambient temperature, has a high magnetic coercivity and is non-responsive to an externally applied magnetic field. However, as the focused laser beam raises the local temperature of the thin film magnetic media, the hot spot can become magnetically soft (i.e., its coercivity decreases), and eventually, at a critical point (the Curie temperature), the coercivity becomes zero. At a certain temperature, the field of the externally applied electromagnet can overcome the media's resistance to reversal, thereby switching its magnetization. Turning the laser off can bring the temperature back to normal (ambient temperature), but the reverse-magnetized domain remains frozen in the film. Recording may be realized by laser power modulation (LPM) or magnetic field modulation (MFM).

SUMMARY OF THE INVENTION

Our work includes an evaluation of the capabilities of thermo-magnetic recording utilizing a focused laser beam. In particular, we note that this technique enables one to write magnetic bits with dimensions in the micrometer range. A minimum size of these written bits can be determined by the focal spot of the laser beam (approximately 1 micrometer). However, since the minimum focal spot may be determined by the diffraction limit $$\left(\text{approximately}\left(\frac{wavelength}{2}\right)\right),$$

the storage capability of thermo-magnetic recording utilizing a focused laser beam, is fundamentally limited.

The discoveries of the present invention, in sharp contrast to the inherent and fundamental limitations of focused laser beam techniques, include novel apparatus and methodology which can qualitatively and advantageously transcend focused laser beam diffraction limited constraints.

In overview, the discoveries and advantages of the present invention can work to circumvent the severe diffraction limited constraints, by using direct thermal coupling between a heater and a magnetic thin film media. In this novel methodology, heat may be deposited onto the magnetic thin film media or surface on a submicroscopic scale. Preferably, a novel nanoscale feature or probe guides the thermal energy and focuses it onto the thermo-magnetic media in the presence of a magnetic bias field. Since the area of the local heating on the surface may be determined approximately by the dimensions of the probe, magnetic bits may be written which are substantially below 0.1 micrometer, i.e., far below the diffraction limit. Consequently, the discoveries of the present invention, in contrast to prior art diffraction limited techniques, can realize significant improvements in data storage densities (approximately by a factor of 10 or larger). Moreover, since the writing speed is governed by thermal diffusion, very high and competitive writing speeds of approximately greater than 100 MHz, can be achieved.

These important aspects relating to the discoveries of the present invention, are usefully restated and reinforced by the following considerations.

In general, the present invention focuses on high density as well as high speed data recording.

With respect to high density, we note the following: The present invention uses the idea of direct thermal coupling between a heater and a magnetic thin film media. The direct thermal coupling can subsume far-field or near-field effects (see below), in order to heat the thin film media, preferably on a very local scale. This scale, in turn, can be made to correlate to the dimensions of a heater probe, which can be easily less than 10,000 A°, e.g., 100 A°. Consequently, the magnetic bits written with thermal coupling can be significantly smaller than the magnetic bits written by conventional techniques; for example, thermal near-field coupling can translate into data storage densities of approximately greater than 100 Gbit/inch$^2$, for example, 400 Gbit/inch$^2$.

With respect to high speed data recording, the writing speed realized by this invention can be very high, because it is only limited by the thermal diffusion length $l=(\kappa \times t)^{0.5}$, where $\kappa$ is the thermal diffusivity and t is the time after the arrival of a heating pulse. Specifically, the heat in a good thermal conductor (approximately $\eta=2\cdot10^{-5}$ m$^2$/s) can diffuse a distance of 0.45 micrometer in only approximately 10 ns corresponding to data recording rates of 100 MHz (C. A. Paddock et al., J. Appl. Phys. 60, 285 (1986)). It should be pointed out that the heat diffusion speed increases considering a three-dimensional heat flow, which promises even higher data recording rates.

Accordingly, pursuant to a first aspect of the present invention, we disclose a novel apparatus for writing/erasing high-density data on a digital recording media as a series of tags comprising a magnetic information bit pattern, the apparatus comprising:

1) a source of thermal radiation for generating an incident wave to the media;
2) means for applying a magnetic bias field on the digital recording media; and
3) means for coordinating a mutual positioning of the incident wave and the media for inducing a direct thermal coupling therebetween; the apparatus capable of writing/erasing said high-density data by at least one of the following actions;
    i) using an information signal for modulating the magnetic bias field;
    ii) using an information signal for modulating the power of the incident thermal wave to the media.

In a second aspect of the present invention, we disclose a novel method for writing/erasing high-density data on a digital recording media as a series of tags comprising a magnetic information bit pattern, the method comprising the steps of:

1) generating and directing an incident thermal wave to the media;
2) applying a magnetic bias field on the digital recording media;

3) coordinating a mutual positioning of the incident wave and the media for inducing a direct thermal coupling therebetween; and 4) writing/erasing said high-density data by at least one of the following actions:
   i) using an information signal for modulating the magnetic bias field;
   ii) using an information signal for modulating the power of the incident wave to the media.

In a third aspect of the present invention, we disclose a novel thermal near-field heater that may be advantageously employed in the above disclosed novel apparatus, and for realizing the above disclosed novel method, especially in a near-field mode.

The novel thermal near-field heater comprises:

1) a heating plate that can operate as a heat source; and
2) a heat sink attached to the heating plate;
the heater capable of developing a thermal coupling with a media, wherein at least one portion of the coupling is in the thermal near-field.

BRIEF DESCRIPTION OF THE DRAWINGS

The invention is illustrated in the accompanying drawing (not drawn to scale), in which.

DETAILED DESCRIPTION OF THE INVENTION

Figure 1A:
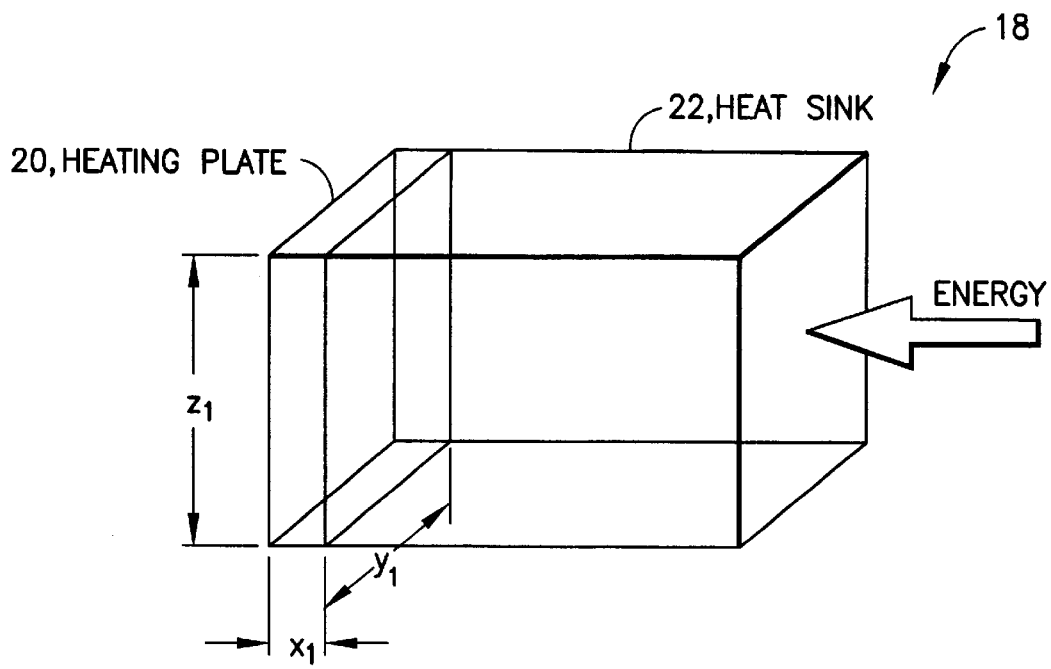
FIGS. 1A–D show alternative embodiments of a novel near-field thermal heater, with emphasis on its heating plate.
Figure 1B:
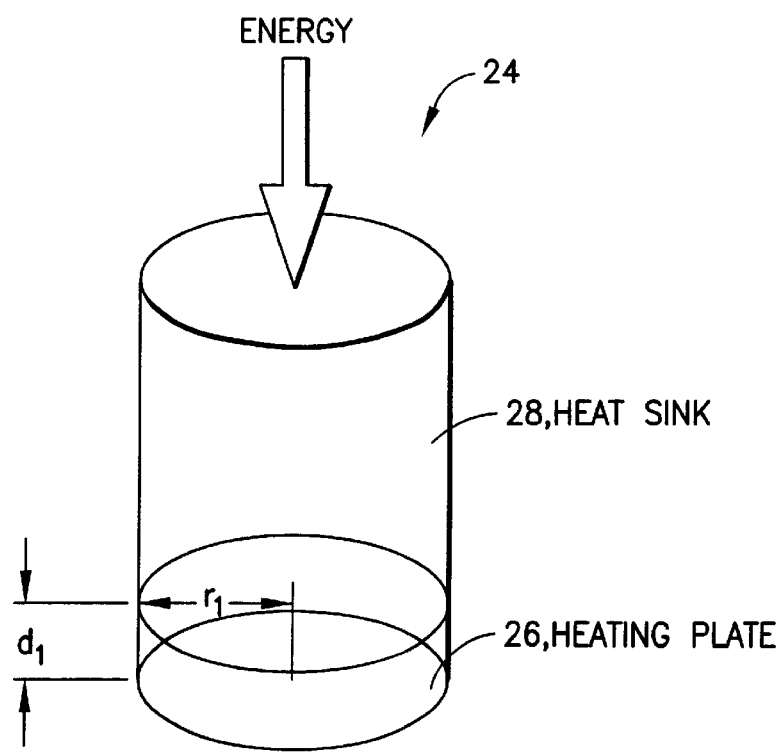

The detailed description of the invention unfolds by first disclosing preferred and/or illustrative aspects of a thermal near-field heater, of the type summarized above. Then, the detailed description focuses attention on the employment of such a thermal near-field heater, in an apparatus suitable for writing/erasing high-density data on a digital recording media, in accordance with the apparatus/methodology summarized above. To this end, reference is made to the FIGS. 1–5.

Thermal Near-Field Heater

As summarized above, a thermal near-field heater of the present invention includes two elements: a heating plate that can operate as a heat source; and, a heat sink attached to the heating plate; the heater capable of developing a thermal near-field coupling with a thermo-magnetic media. Attention is now directed to FIGS. 1A–D, which help illustrate the many different geometrical, dimensional, and material configurations which may be suitably adapted for a particular realization of the thermal near-field heater.

In overview of the FIGS. 1A–D thermal near-field heaters, it is noted that their purpose is to deposit heat energy to a thermal-magnetic media. This energy can be almost any kind; e.g., coherent or non-coherent excitons, plasmons, phonons, photons, etc., and it can be delivered in any mode, e.g., as convective, radiative, or conductive transfer. For example, it can be delivered in any mode from the heat source to the media. The heat transfer (J. B. Xu, K. Läuger, R. Möller, K. Dransfeld, I. H. Wilsom, J. Appl. Phys. 76, 7209 (1994)) is generally diffusive, if the mean free path of molecules $\lambda$ is much less than the distance of the heater to media d. However, if the d<$\lambda$, the molecules in the junction go from the heater to the media without collisions, and transfer the heat in a ballistic manner. In addition, heat can be transferred via propagating radiation according to the Stefan-Boltzmann law. Furthermore, non-propagating waves (near-field) are capable for transfering the heat via a tunneling process when heater and media are very close to each other (near-field region).

Good geometrical conductors for our thermal near-field heater include rectangular or cylindrical design, of the type shown in FIGS. 1, A, B, respectively (numerals 10–20).

For example, the preferred dimensions of $y_1$ and $z_1$ (FIG. 1A) or $r_1$ (FIG. 1B) are informed by the way the thermal energy is to be deposited. For instance, if one uses a focused laser beam to heat up the heating plates (12, 18), $y_1$ and $z_1$ or $r_1$ preferably are larger than the waist of the laser focus (e.g., for a numerical aperture of 0.8 $y_1$, $z_1$, $r_1$>0.8 micrometer). If, on the other hand, one uses a wave-guided laser beam, then the heating plate (12,18), preferably is attached right onto the end of a fiber (maybe via vapor deposition). Therefore, the heating plate (18) preferably has a cylindrical shape, and $r_1$ is determined by the wave-guide size. More specifically, for a single mode fiber in the visible wavelength range, $r_1$ preferably is approximately 3–4 micrometer. If one uses tapered fiber, $r_1$ preferably is larger than or equal $\lambda/2$, where $\lambda$ is the wavelength of the utilized laser light. If, alternatively, one uses resistive heating, then one chooses, most likely, a rectangular shape, and the dimensions are preferably dominated by the connections and the resulting resistance.

In the case of resistive heating, these dimensions can be rather small ($y_1$, $z_1$<0.1 micrometer) if they are made via e-beam lithography. We note that in the case of resistive heating, the dimensions as well as the material determine the actual resistance, and hence the heating.

While the $y_1$, $z_1$, $r_1$ dimensions are determined mostly by practical needs, the thickness of the heating plate (12, 18) itself should be rather small ($d_1$, $x_1$<0.5 micrometer), for example, if the device is to be used for high speed recording. More specifically, in high speed applications, one preferably uses energy pulses to deposit the heat in the heating plate, so as to subsequently heat up the near-field heat source, e.g., a tip or an edge of the heating plate.

In order to heat up again, the deposited heat (from a last pulse), has to be dissipated. This dissipation is governed by the thermal diffusion length $l=(\kappa \cdot t)^{0.5}$, where $\kappa$ is the thermal diffusivity and t is the time after the arrival of a heat pulse. Specifically, the heat in a good thermal conductor (approximately $\kappa=2 \cdot 10^{-5} m^2 s^{-1}$) can diffuse a distance of 0.45 micrometer in only 10 ns, corresponding to recording rates of 100 MHz. If one uses a laser beam to deposit the heat, it is noted that the heating plate (12, 18) preferably should be at least of the thickness of the skin depth at the laser frequency. Specifically, for a very high absorbing material (e.g., Al) it preferably is larger than 10 nm at 633 nm.

The heating plate (12, 18) can be made out of any material, but in general the following requirements preferably exist. (1) The material preferably has a high melting point (T>1100K), generally higher than the temperature, which is necessary for the recording. (2) It preferably has a high thermal diffusivity ($\kappa > 1 \cdot 10^{-5} m^2 s^{-1}$, e.g., metals and alloys). (3) The material preferably is high absorbing if a laser is used for the heating (e.g., Cr, Al).

Figure 1C:
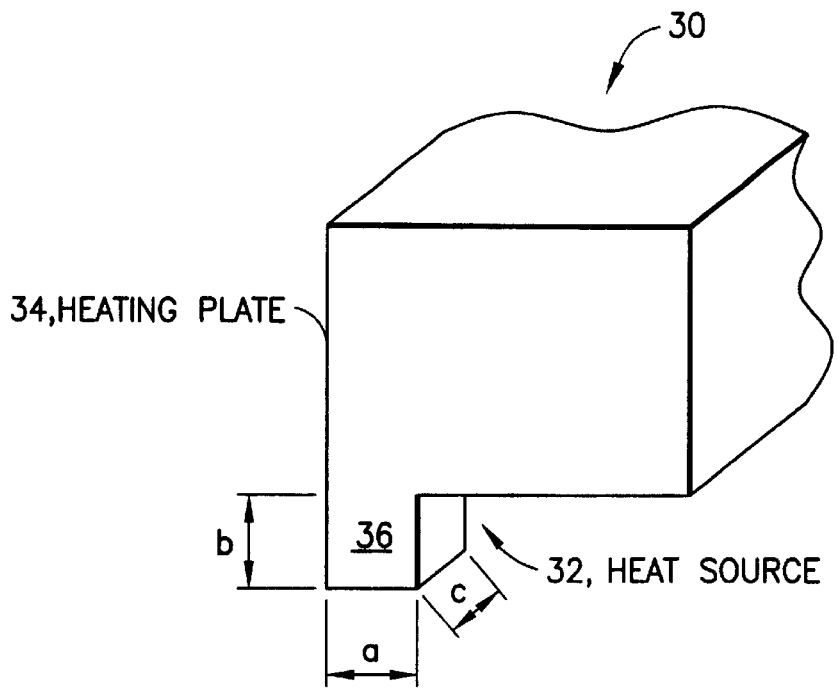
Figure 1D:
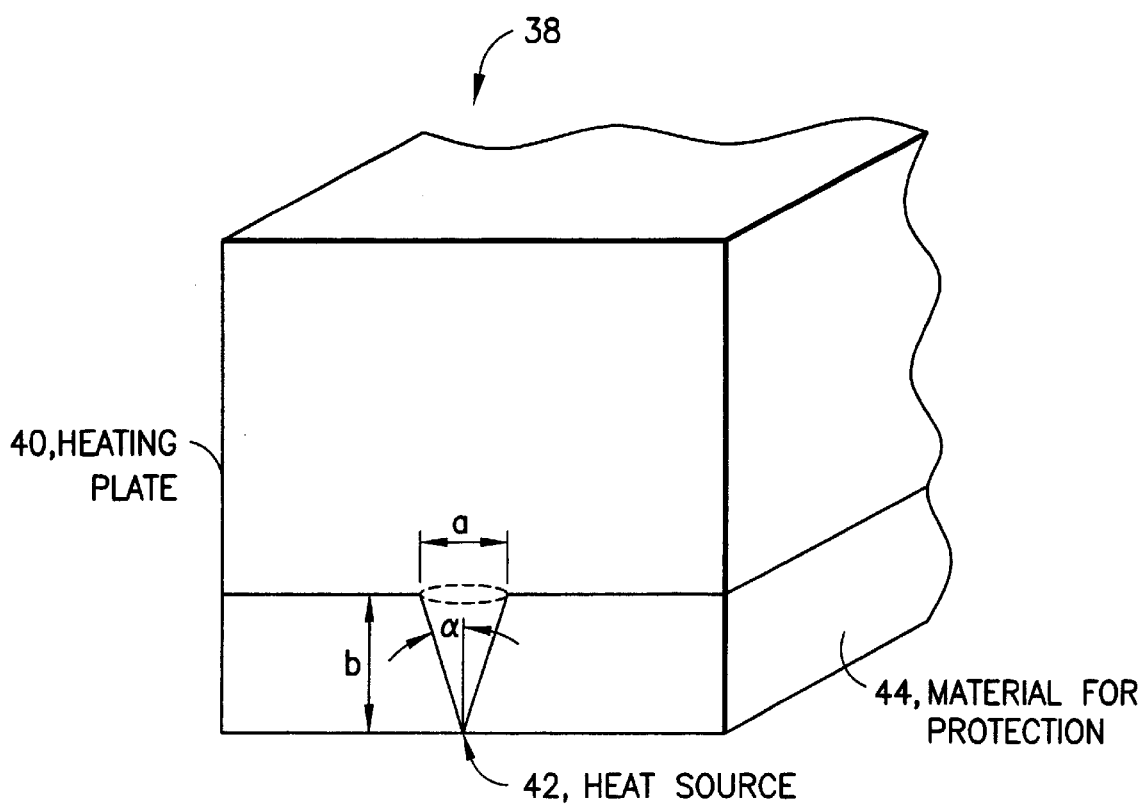

As explained above, a generic purpose of the heat plate operating as a heat source is to guide the thermal energy to a thermo-magnetic media. It should be noted that the heating plate is generally hot, and hence generally capable of heating the media. However, such general heating may not always be optimal, since the dimensions of the heating plate may be large, resulting in a large bit. One purpose of the heat source, accordingly, may be to avoid general heating from the heating plate, and to instead focus the thermal energy to a very small point. An attendant and novel property is then to generate a thermal near-field, which can interact very locally, preferably on a nanometer scale, with the media. To this end, the heating plate operating as a heat source can have all kinds of shapes and dimensions. For example, the heat source may be just an edge (24) of a heating plate (FIG. 1C), or a truncated cone (28) (FIG. 1D). Sometimes, the heat source may be usefully protected by some low heat conducting material (30) (e.g., glass).

Overall, the shape and dimensions of the heating plate operating as a heat source are influenced by the following requirements. (1) For high speed application, a designer preferably chooses shape and dimensions which transfer the heat as fast as possible. In general, that means that a heat source preferably should have a small length b (e.g., b<0.5 micrometer), in order to achieve sufficient heat dissipation within its thermal diffusion length. If one just considers high speed applications, one may be tempted to choose large dimensions of a, c (FIG. 1C) and a, a (FIG. 1D) in order to avoid a slow one-dimensional heat conduction. (2) However, besides high speed, a heat source preferably provides a very local heating, avoiding any stray heat from the heating plate, generally. Accordingly, this correlates with opposite requirements for the dimensions. For a very local heating, preferably choose b large (>0.1 micrometer), and the dimensions a,c small (<0.01 micrometer) (FIG. 1C) as well as a small a and $\alpha$ (a<0.1 micrometer, $\alpha$<15°, FIG. 1D). We note increasing power loss with decreasing dimensions in a,c (FIG. 1C) and a,$\alpha$ (FIG. 1D), which may result in insufficient and very ineffective heating. (3) The shape and dimensions of the heat source are preferably matched to a bit size and a bit pattern. In general, the bits are typically larger or equal to the dimensions of a heat source. Specifically, for a 20 nm bit, preferably work with a heat source of the dimensions a,c>>20 nm (FIG. 1C).

The material of the heating plate can be almost any kind. We note that an edge or tip material is preferably governed by the same general material requirements as that of the heating plate, proper.

We recall from above that our novel thermal near-field heater includes a second element, namely, a heat sink attached to the heating plate. We now turn our particular attention to this second element.

Figure 2A:
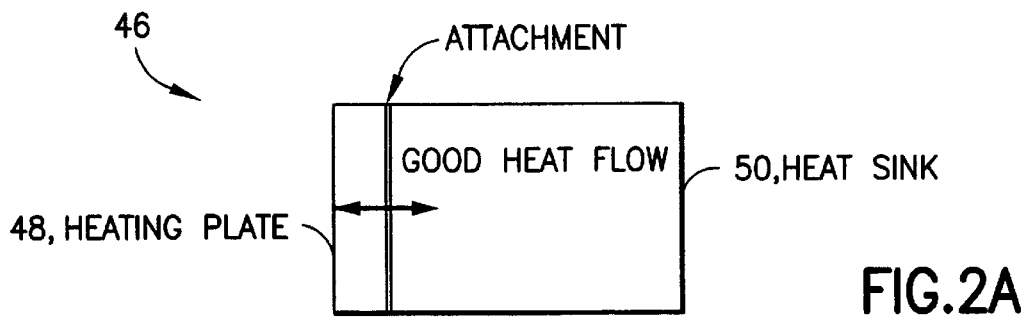
FIGS. 2A–C show alternative embodiments of a novel near-field thermal heater, with emphasis on its heat sink.
Figure 2B:
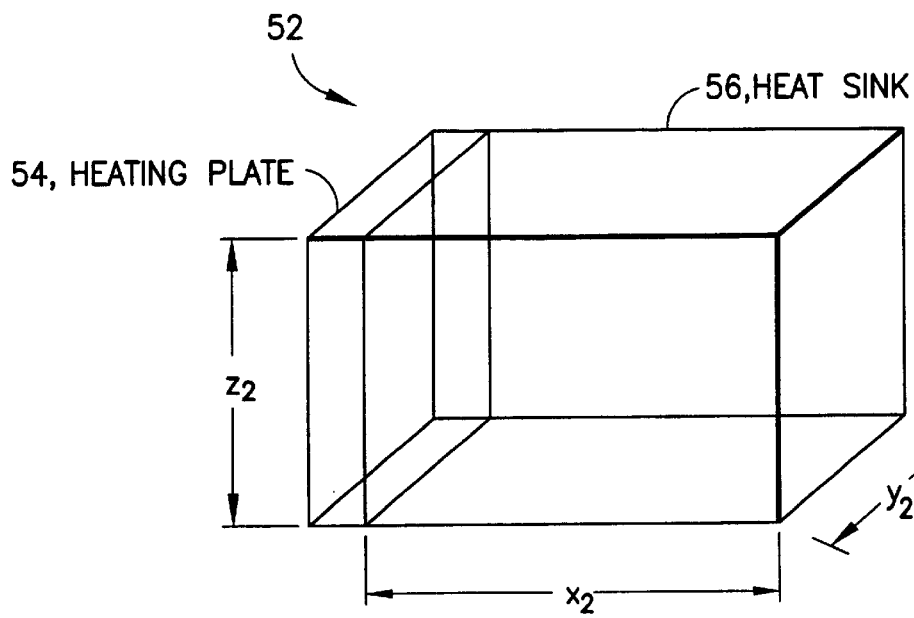
Figure 2C:
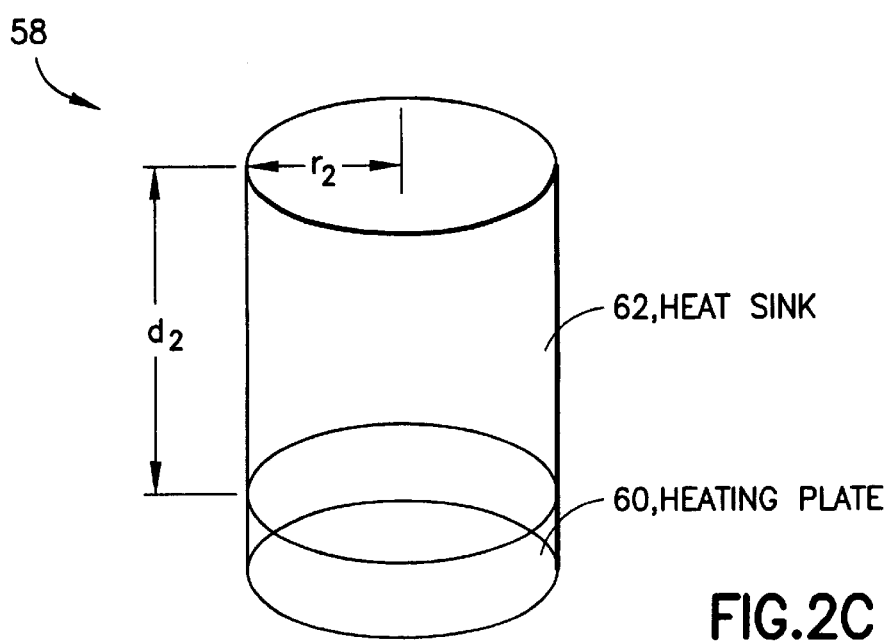

An important purpose of the heat sink is to dissipate deposited heat as fast as possible, in order to get ready for a new heating pulse. Therefore, the heat sink is preferably attached to the heating plate (FIG. 2A, numerals 32–36). This attachment preferably is made in such a way that the heat conduction between heat sink and heating plate is as good as possible ($\kappa > 1 \cdot 10^{-5} m^2 s^{-1}$) Therefore, it may be very advantageous if the heat sink and the heating plate are made out of the same piece of material. In other cases, the heat sink may be welded, glued, or deposited (via e-beam, vapor, sputtering etc.) right on the heating plate.

Dimensions and shape for the heat sink are not very critical, so that only guidelines can be given here. In general, the heat sink can have all kinds of shapes. However, in typical cases, it may be cylindrical or rectangular (see FIGS. 2B, C, numerals 38–48). To provide a sufficient heat sink mass, the heat sink preferably is as large as possible. Large dimensions (>1 micrometer) of $y_2$, $z_2$ and $r_2$ may result in a three-dimensional heat flow greatly enhancing the speed for heat dissipation. The dimensions and the shape of the heat sink do not have to necessarily match the dimensions of the attached heating plate. However, in general the heat sink preferably has dimensions larger or equal to the heating plate (e.g., $y_2 \geq y_1$, $z_2 \geq z_1$, $r_2 \geq r_1$). In terms of the thickness of the heat sink, we note that $d_2$ and $x_2$ should preferably be at least the thermal diffusion length l for a given heating repetition rate 1/t. The material of the heat source can be almost any kind. In analogy to the heating plate and the heat tip or edge, the material of the heat sink preferably has a high melting point as well as a high heat conductivity. However, in some cases the material should not be high absorbing at the laser wavelength, if the laser has to be focused on the heating plate through the heat sink material. In such case, preferably use a transparent material, which is still a good heat conductor and has a high melting point (e.g., diamond).

The Thermal Near-Field

It is asserted above that the invention uses the idea of direct thermal coupling between a heater and a magnetic thin film media, and, that this coupling can subsume far-field and/or near-field effects. In particular, near-field effects may include a continuum that may extend from coupling that subsumes at least one portion of the thermal near-field; ranging e.g., from partially inclusive, to substantially or even complete coupling in the thermal near-field. We now provide a working definition, for the purposes of a utility of this invention; of the thermal near-field a utility of the invention generally captured in the notion that increased storage and speed generally correlate to operation more extensively in the thermal near-field.

Figure 3:
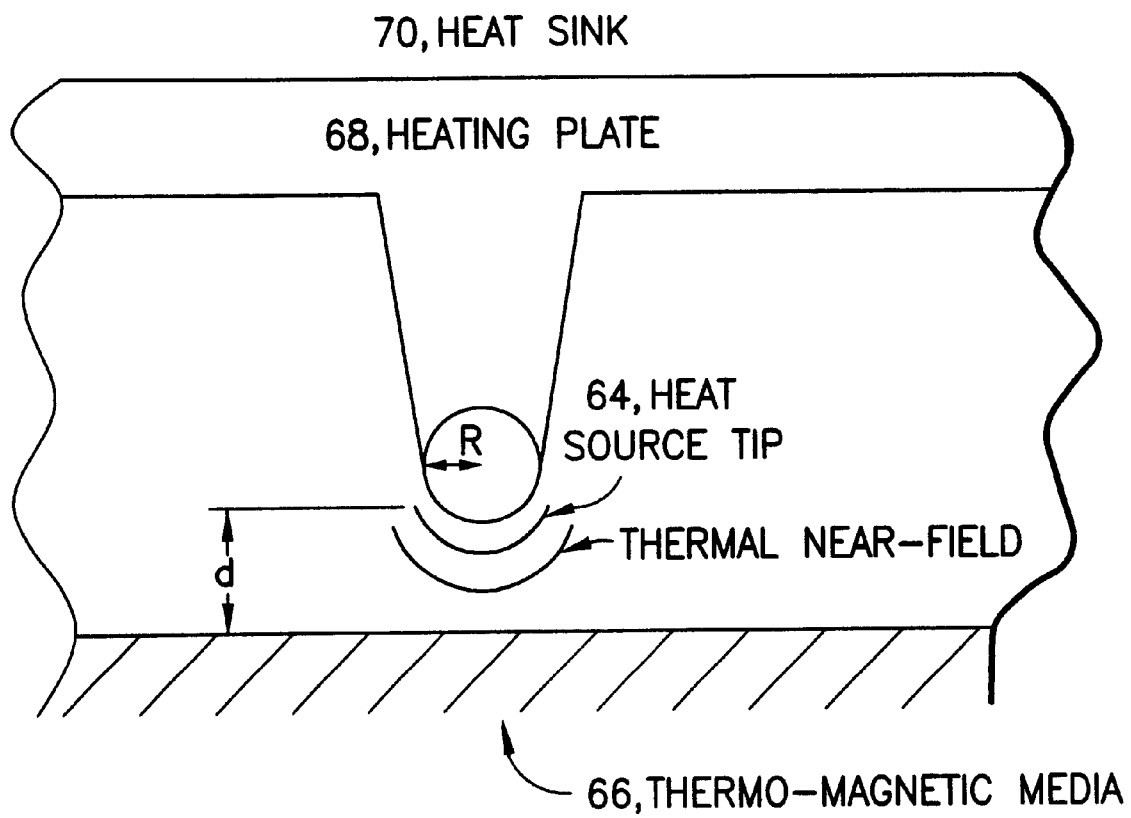
FIG. 3 provides a schematic useful for developing the notion of a near and far-field, as this concept relates to the present invention.
Figure 4:
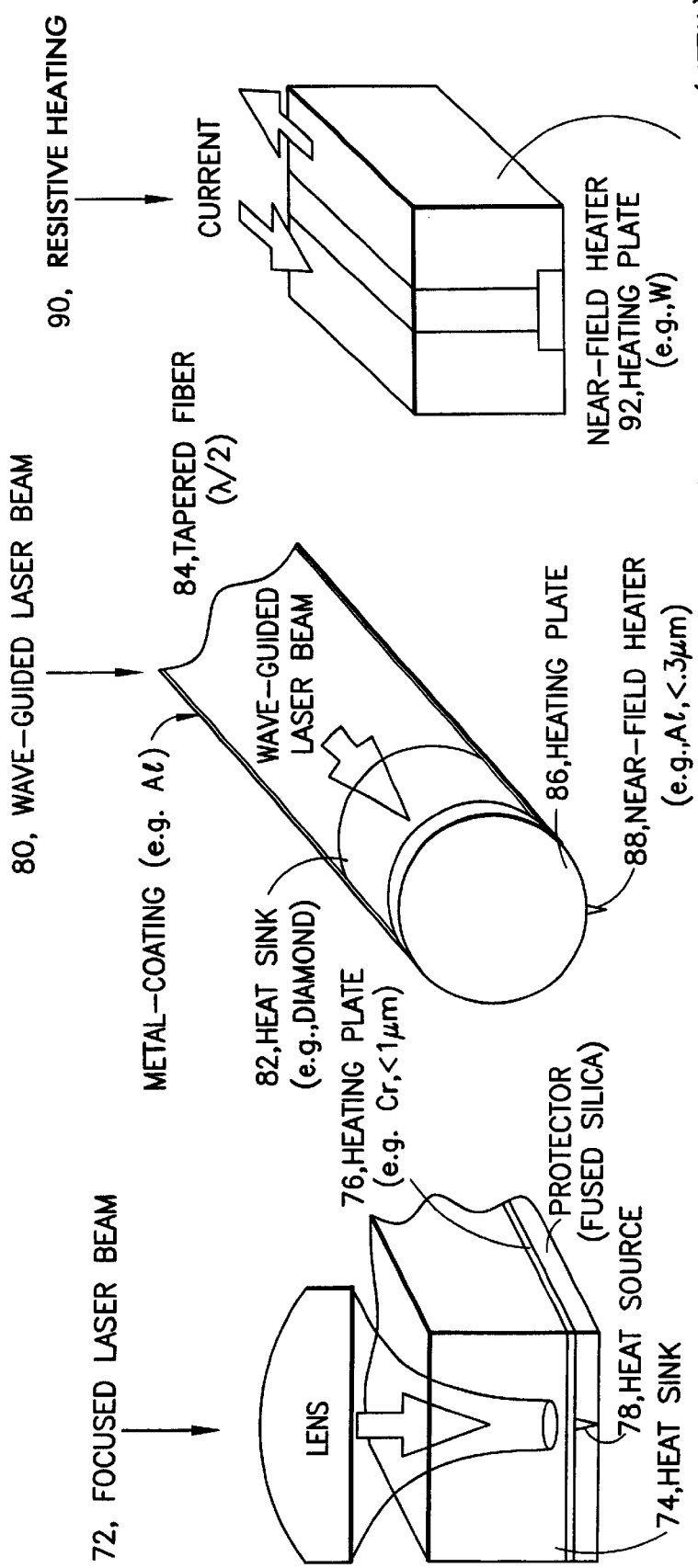
FIGS. 4A–C show illustrative embodiments of mechanisms for depositing thermal energy to the invention's thermal heater.

The concept of the thermal near-field is now explained, using an illustrative FIG. 3. Here, a heat source tip (50) interacts via its thermal near-field with a thermo-magnetic media (52). The FIG. 3 heat source tip (50) is spherical at its end with a radius R. For purposes of this invention, the thermal near-field region is the area generally within 2R away from the heat source tip (50). The rest of the area is generally called far-field. We note that in the near-field region, the extent of the thermal energy is generally governed by the heat source tip dimensions. Therefore, if the heat source tip is brought within approximately 2R to the thermo-magnetic media (52), very local, nanoscale heating of the media can be achieved. A heated area is then determined by the heat source dimensions, rather than the energy or wavelength, which is a basic idea of this aspect of the invention.

In this particular application of heat flow, in the far-field the heat is transferred via diffusion as well as via radiation according to the Stefan-Boltzmann law. In the near-field a ballistic heat flow, where a gas molecule picks up some energy from heater and transfers it without collisions to the media, as well as heat conduction via non-propagating waves are important. We also note that contamination layers on the surface may contribute significantly to the near-field and far-field heat flow.

Heat Supply Systems

As mentioned earlier, there may be different ways of supplying the thermal energy; examples are illustrated in FIGS. 4A, B, C.

FIG. 4A shows a focused laser beam embodiment (58), wherein laser light is brought through a heat sink (60) onto a heating plate (62). In this case, we prefer the use of diamond as a heat sink material, which is transparent and has an excellent heat conductivity. An alternative material could be Si, if an infrared laser is used. The heating plate (62) can be very thin (0.1 micrometer) if a high absorbing material is used (e.g., Al, Cr.). Directly attached to the heating plate (62) is a heat tip or feature (64), which preferably is short (<0.3 micrometer). The material of the heat tip or feature (64) can be Cr as well or Al. In these cases, the heat tip or feature preferably is protected with a low heat conducting material, such as glass. Simple estimations about the heat flow suggest that such a device can record data with>100 MHz.

FIG. 4B shows an alternative embodiment comprising a wave-guide laser beam (66) used for the heating. In this embodiment, a heat sink (68), which preferably is made out of diamond, may be directly attached to the end of a fiber (70). In other cases, a metal-coating (72) (e.g., Al) of the wave-guide can be used as a heat sink (68). The wave-guide laser beam is absorbed by a thin (<0.1 micrometer) heating plate (74) directly attached to the fiber or heat sink. Again as a material, Cr or Al may be advantageous, which have generally a small skin depth (<0.02 micrometer). A heat source or tip (76) can be an edge or a little probe attached to the heating plate (74). In such a design, the heat source or tip exemplary has a length<0.3 micrometer.

FIG. 4C shows a further alternative embodiment wherein resistive heating (78) is used to heat up a heating plate (80). As a heat sink (82), the transmission lines could be used, which may be out of a metal such as Cu. The two transmission lines are separated by a non-conducting material, for example, diamond or even glass. Diamond has an advantage, in that it is a very good heat conductor, and can assist the heat sink (82). The two transmission lines are connected via the heating plate (80), which can act as a heating source. The heating plate (80) can be very small, e.g., (<0.05 micrometer). As a material for heating plate and the heat source, tungsten may be very suitable, because of its resistance and high melting point.

As intimated above, the present invention develops and exploits an idea of direct thermal coupling between a thermal heater and a thermo-magnetic thin film media, to an end of writing/erasing magnetic information on the media. Moreover, this direct thermal coupling subsumes far-field as well as near-field thermal coupling.

Figure 5:
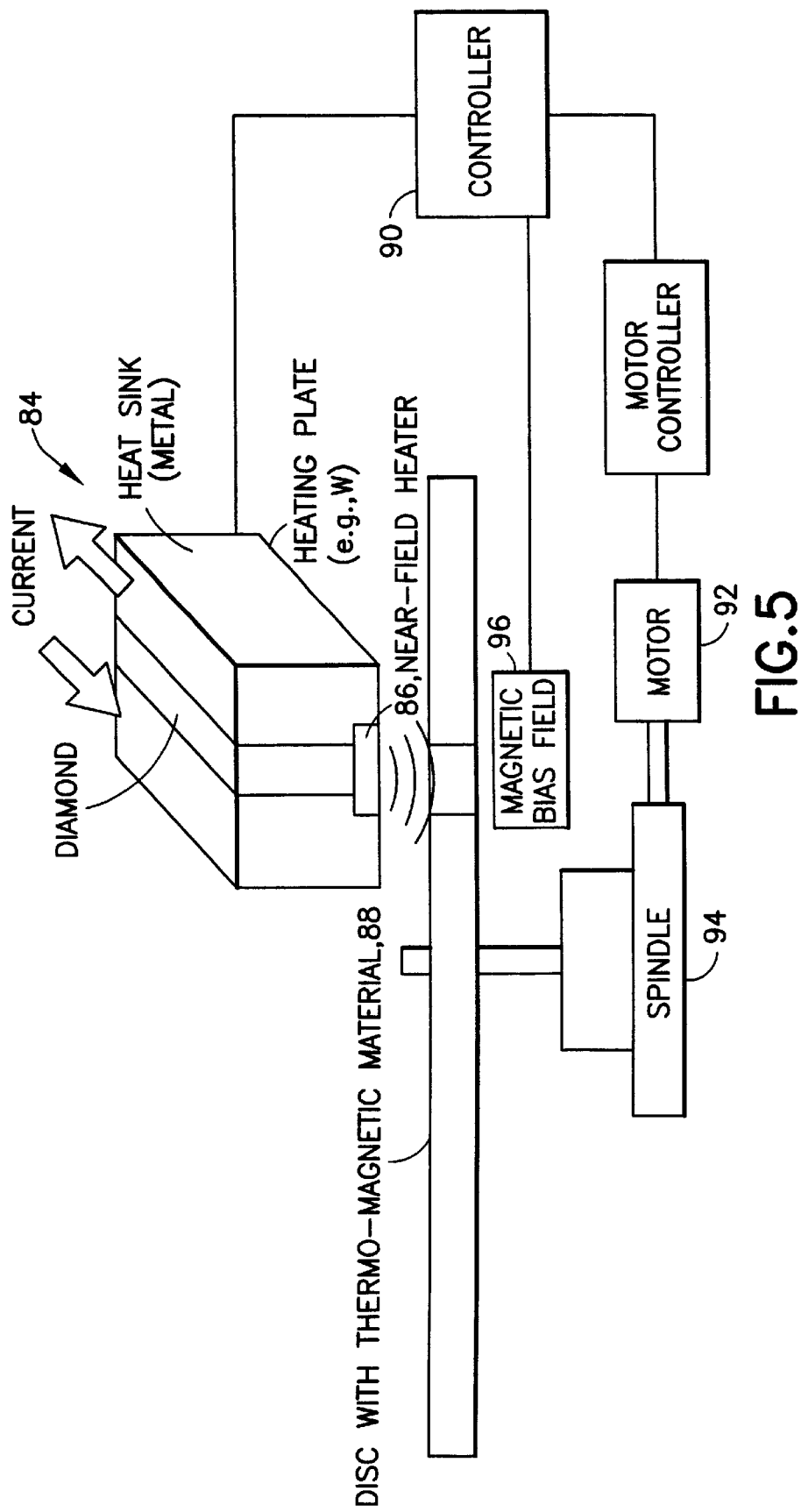
FIG. 5 shows apparatus that can be built in accordance with principles of the present invention.

FIG. 5 shows an apparatus (numerals 84–96) that may be built in fulfillment of this idea. The apparatus (84) includes a source of thermal radiation (86) for directing an incident thermal wave to a disc comprising thermo-magnetic metal (88). A controller (90)-motor (92)-spindle (94) assembly may be employed for coordinating a mutual positioning of the incident thermal wave and the magnetic material (88), for inducing a direct near-field or far-field thermal coupling, therebetween. A magnetic bias field (96) is connected to the controller (90). Operation of the FIG. 5 apparatus (84) may be effected in accordance with methodology summarized above; namely, writing/erasing high-density data by at least one of using an information signal for modulating the magnetic bias field (96) or the power of the incident thermal wave to the magnetic material (88).

Note in this regard that the magnetic bias field may be pulsed, or permanent, or any direction, or may be global or local; and the thermal wave can be pulsed or continuous.

What is claimed:

1. An apparatus for writing/erasing high-density data on a recording medium as a series of tags comprising a magnetic information bit pattern, the apparatus comprising:

a source of thermal radiation for generating and directing an incident wave to said medium;

means for applying a magnetic bias field on said recording medium; and means for coordinating a mutual positioning of the incident wave and said medium for inducing a direct thermal coupling between said source of thermal radiation and said medium wherein the apparatus writes/erases said high-density data by modulating the power of the incident thermal wave to said medium.

2. An apparatus according to claim 1, wherein said source of thermal radiation comprises a thermal near-field heater comprising:

a heating plate that can operate as a heat source; and a heat sink attached to the heating plate, wherein the heater is capable of developing a thermal coupling with said medium, and wherein at least one portion of the coupling is in a thermal near-field.

3. An apparatus for writing/erasing high-density data on a recording medium as a series of tags comprising a magnetic information bit pattern, the apparatus comprising:

a source of thermal radiation for generating and directing an incident wave to said medium;

means for applying a magnetic bias field on said recording medium; and means for coordinating a mutual positioning of the incident wave and said medium for inducing a direct thermal coupling between said source of thermal radiation and said medium, wherein the apparatus writes/erases said high-density data by at least one of using an information signal for modulating the magnetic bias field, and using an information signal for modulating the power of the incident thermal wave to the media, wherein said direct thermal coupling subsumes at least one portion of a thermal near-field.

4. A method for writing/erasing high-density data on a recording medium as a series of tags comprising a magnetic information bit pattern, the method comprising:

generating and directing an incident thermal wave to said medium;

applying a magnetic bias field on said medium;

coordinating a mutual positioning of the incident wave and said medium for inducing a direct thermal coupling between a source of said incident thermal wave and said medium; and writing/erasing said high-density data by modulating the power of the incident wave to said medium.

5. A method according to claim 4, wherein said incident thermal wave is directed to said medium by guiding it with a nanoscale probe.

6. A method according to claim 5 wherein the nanoscale probe has dimensions less than at least 10,000 A°.

7. A method according to claim 4, wherein said generating and directing an incident thermal wave comprises using a thermal near-field heater, said heater comprising:

a heating plate that can operate as a heat source; and a heat sink attached to the heating plate;

wherein the heater develops a thermal coupling with said medium and at least a portion of the coupling is in a thermal near-field.

8. A method according to claim 7, wherein said coordinating a mutual positioning comprises incorporating the near-field heater as part of a slider in a disc head.

9. A method according to claim 7, wherein the thermal expansion of the near-field heater is used for controlling a distance between said medium and the near-field heater.

10. A method according to claim 4, wherein said applying a magnetic bias field comprises applying a global magnetic bias field on the whole recording medium.

11. A method according to claim 4, wherein said applying a magnetic bias field comprises applying a local magnetic bias field on the recording medium.

12. A method according to claim 4, wherein said applying a magnetic bias field comprises pulsing the magnetic field bias.

13. A method for writing/erasing high-density data on a recording medium as a series of tags comprising a magnetic information bit pattern, the method comprising:

generating and directing an incident thermal wave to said medium;

applying a magnetic bias field of said medium;

coordinating a mutual positioning of he incident wave and said medium for inducing a direct thermal coupling between a source of said incident thermal wave and said medium; and writing/erasing said high-density data by at least one of using an information signal for modulating the magnetic bias field, and using an information signal for modulating the power of the incident wave to said medium;

wherein at least a portion of the coupling is in a thermal near-field.

14. A thermal near-field heater comprising:

a heating plate that can operate as a heat source; and a heat sink attached to the heating plate, wherein the heater develops a thermal near-field coupling with a recording medium.

15. A heater according to claim 14, wherein the heating plate comprises a tip that can operate as the heat source.

16. A heater according to claim 14, wherein the heating plate defines a dedicated edge that can operate as the heat source.

17. A heater according to claim 14, further comprising:

a focused laser beam thermally coupled to the heat sink.

18. A heater according to claim 14, further comprising:

a wave-guided laser beam thermally coupled to the heat sink.

19. A heater according to claim 14, further comprising:

a resistive heating unit thermally coupled to the heat sink.

20. An apparatus for writing data on a recording medium, said apparatus comprising:

heater for generating a the wave incident to said medium;

a controller for coordinating a mutual positioning of said heater and said medium so as to induce a thermal coupling between said heater and said medium; and a magnetic bias field generator for applying a magnetic bias field to said medium so as to write data on said medium in the form of a magnetic bit pattern, wherein at least a portion of said thermal coupling is in a thermal near-field.

21. An apparatus according to claim 20, wherein said heater relaxes a coercivity of said medium so that said magnetic bias field may write data on said medium.

22. An apparatus according to claim 20, wherein said magnetic bias field is applied in an area of said thermal coupling.

23. A method for writing data on a recording medium, said method comprising:

generating a thermal wave incident to said medium:

coordinating a mutual positioning of a source of said thermal wave and said medium so as to induce a thermal coupling between said source and said medium; and applying a magnetic bias field to said medium so as to write data on said medium in the form of a magnetic bit pattern, wherein at least a portion of said thermal coupling is in a thermal near-field.

* * * * *